United States Patent [19]

Saylor et al.

[11] 3,841,451
[45] Oct. 15, 1974

[54] VISCOUS FLUID CLUTCH

[75] Inventors: Randall K. Saylor, Kettering; Thomas J. Knab, Dayton, both of Ohio

[73] Assignee: General Motors Corporation, Detroit, Mich.

[22] Filed: Aug. 7, 1973

[21] Appl. No.: 386,368

[52] U.S. Cl. ............................ 192/58 B, 192/82 T
[51] Int. Cl. ........................................ F16d 35/00
[58] Field of Search ...................... 192/58 B, 82 T

[56] References Cited
UNITED STATES PATENTS

| | | | |
|---|---|---|---|
| 3,259,221 | 7/1966 | Godfrey | 192/58 B |
| 3,363,734 | 1/1968 | Sabat | 192/58 B |
| 3,587,801 | 6/1971 | Riner | 192/58 B |
| 3,690,428 | 9/1972 | Laflame | 192/58 B |
| 3,713,520 | 1/1973 | Kerr | 192/58 B |

Primary Examiner—Allan D. Herrmann
Attorney, Agent, or Firm—John P. Moran

[57] ABSTRACT

A viscous fluid clutch including relatively rotatable first and second drive members having a fluid shear space therebetween and which are cooperable with a fluid medium in the shear space to provide a shear-type fluid drive therebetween, and an annular reservoir for storing a fluid medium, a pair of oppositely disposed continuously open inlet ports for permitting the fluid medium to flow from the reservoir to the shear space, a continuously open primary discharge port and pump means therefor, and a secondary discharge port controlled by an internally mounted temperature-responsive bimetallic strip, the latter two discharge ports cooperating to pump the fluid medium out of the shear space into the reservoir, and the inlet and outlet ports being located the maximum circumferential distance apart with respect to the direction of the fluid flow.

4 Claims, 3 Drawing Figures

PATENTED OCT 15 1974  3,841,451

VISCOUS FLUID CLUTCH

This invention relates generally to fluid drive devices, and more particularly to a viscous fluid clutch device adapted to drive a vehicular accessory, such as a cooling fan for internal combustion engines.

Such vehicular cooling fans are generally belt-driven from the engine crankshaft. It has been found desirable to vary the speed ratio of the fan with respect to the engine speed so that at low engine speeds the fan will run at a relatively high speed for maximum cooling, and as the speed of the engine increases, such as when the vehicle is running in direct drive at road speeds and the ram air cooling effect on the engine is increased, the fan will run at a relatively low speed. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to eliminate the usual external temperature-responsive bimetallic fluid-flow control arrangement and to substitute a continuously open fluid-flow arrangement therefor.

Another object of the invention is to provide an internally mounted temperature-responsive bimetallic valve for controlling one discharge port in conjunction with a continuously open discharge port having a pump or dam element associated therewith.

A further object of the invention is to provide a circumferentially coordinate, simplified, internally controlled temperature-responsive fan clutch fluid-flow system which may be effectively used in lieu of the usual externally controlled temperature-responsive fan clutch fluid-flow system.

Still another object of the invention is to provide a viscous fluid clutch wherein the flow of fluid from the working chamber to the reservoir chamber is in part controlled by an internal bimetallic strip and in part by conventional pump or dam element means, while the flow from the reservoir chamber to the working chamber is continuous.

A more specific object of the invention is to provide a viscous shear fan drive having a housing including a finned rear wall, a front wall, a divider wall therebetween, an operating or working chamber formed between the rear and divider walls for receiving a clutch plate in viscous shear drive relationship with the housing, an annular reservoir formed between the divider and front walls, two oppositely disposed continuously open inlet ports formed in the divider wall for permitting the fluid to flow from the reservoir into the working chamber, and two oppositely disposed discharge ports formed in the divider wall, one being continuously open, and the other being controlled by an internal bimetallic valve mounted on the divider wall, and both having a pump or dam element associated therewith for pumping the fluid from the working chamber into the reservoir, with the two inlet ports being located the maximum circumferential fluid-flow distance from the discharge port.

These and other objects and advantages of the invention will be apparent when reference is made to the following description and accompanying drawings, wherein.

Figure 1:
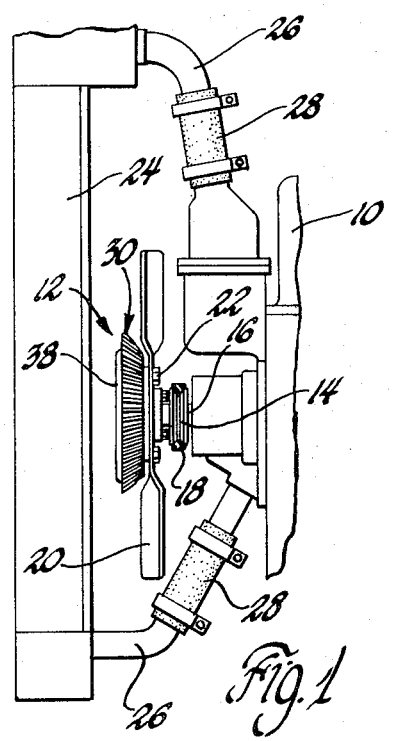
FIG. 1 is a fragmentary side elevational view of a radiator and engine having a viscous fluid clutch-driven cooling fan associated therewith.

Referring to the drawings in greater detail, FIG. 1 illustrates an engine 10 having a viscous fluid clutch 12 and a pulley 14 mounted on a drive shaft 16 extending therefrom, the pulley 14 being rotated by a V-belt 18 connected to the crankshaft (not shown) for driving a cooling fan 20 secured to the clutch 12 by bolts 22. The fluid clutch 12 and the cooling fan 20 are located between the engine 10 and a radiator 24. The usual conduits 26 and associated hoses 28 communicate between the radiator 24 and the engine 10 adjacent the drive shaft 16.

Figure 2:
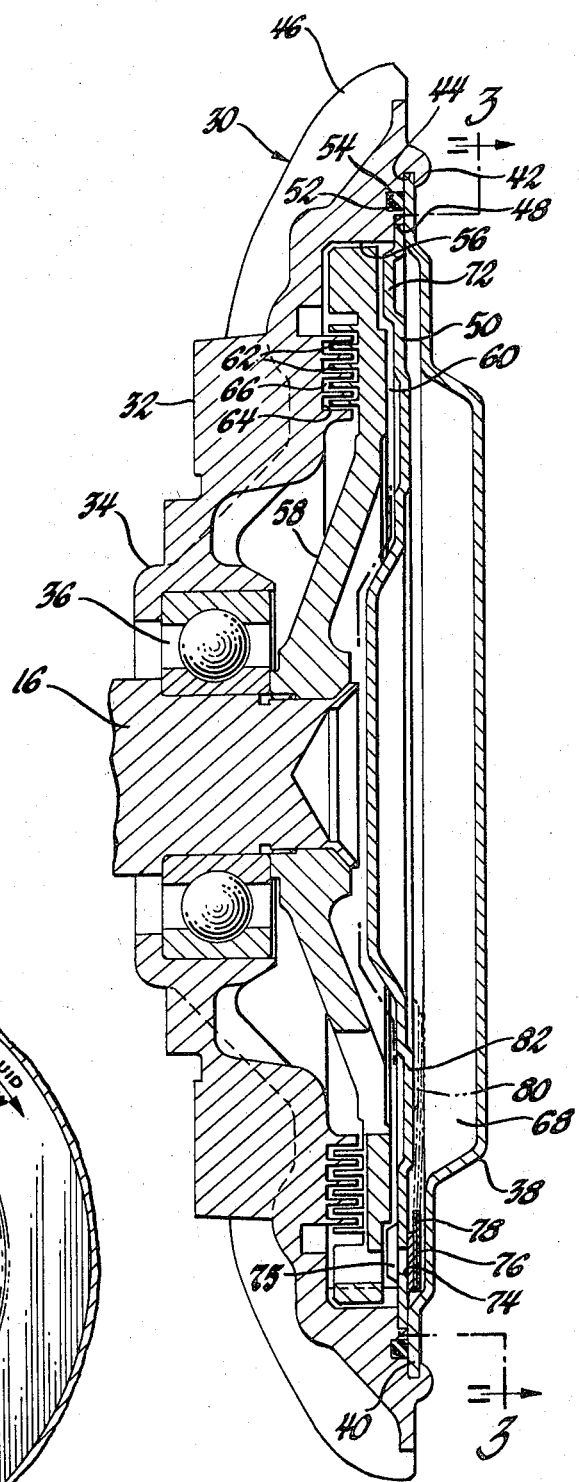
FIG. 2 is an enlarged cross-sectional view, taken on line 2—2 of FIG. 3, of a viscous fluid, shear-type clutch embodying the invention.

Referring now to FIG. 2, the fluid clutch 12 includes a housing 30 which includes a rear wall 32 having a hub 34 rotatably mounted by suitable bearings 36 on the drive shaft 16. The housing 30 further includes a cover member or front wall 38 which has an annular flat surface 40 formed adjacent its peripheral edge, the latter being confined by an annular lip 42 in an annular recess 44 formed in the housing 30. Cooling fins 46 are formed on the outer surface of the rear wall 32. A second annular recess 48 is formed radially inward of the outer periphery of the annular recess 44. A divider wall 50 is confined adjacent its outer edge in the recess 48 by the cover member 38. A seal 52 is compressed in an annular groove 54 formed in the rear wall 32 intermediate the outer edges of the annular recesses 44 and 48. A third annular deeper recess 56 is formed in the rear wall 32 radially inward of the second annular recess 48. A clutch plate 58 is secured at its center by any suitable means to the drive shaft 16, the outer peripheral portion thereof being freely located in an operating or working chamber 60 formed by the third annular recess 56.

Adjacent portions of the clutch plate 58 and the rear wall 32 are provided with torque-transmitting elements consisting of cooperating annular ridge and groove elements 62 and 64, respectively, with an intervening fluid shear space 66 therebetween to accommodate a viscous fluid as a torque-transmitting medium.

Figure 3:
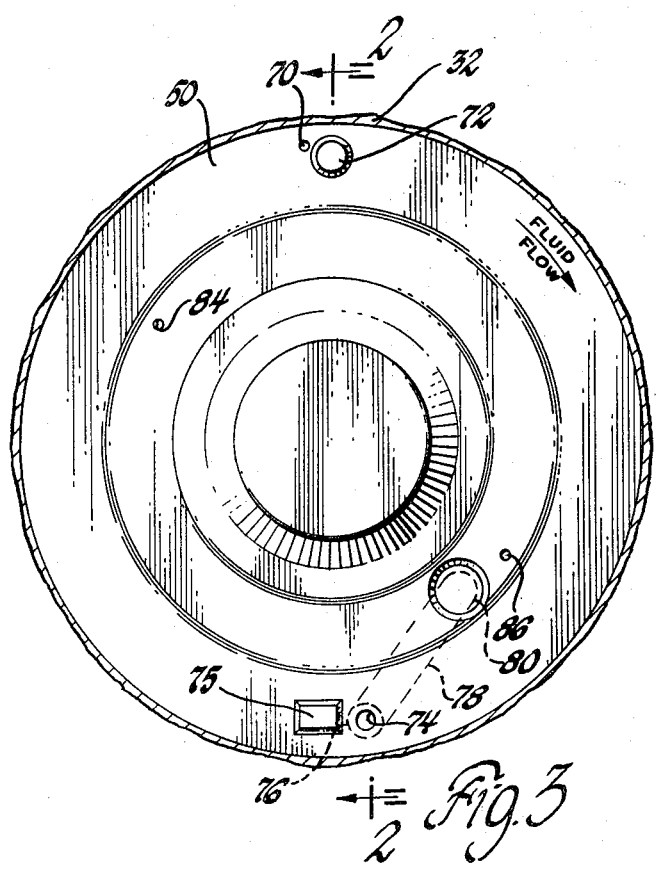
FIG. 3 is a fragmentary end view taken on the plane of line 3—3 of FIG. 2, as if FIG. 2 were a full round view, and looking in the direction of the arrows.

It may be noted in FIG. 2 that the front wall or cover member 38 is formed to provide an annular reservoir 68 adjacent the divider wall 50. As illustrated in FIG. 3, a primary pump outlet opening or discharge port 70 is formed through the divider wall 50 adjacent a pump or dam element 72 formed on the divider wall 50 at a radial outer portion thereof, the opening 70 communicating between the working chamber 60 and the annular reservoir 68. As illustrated, the pump element may consist of the circular boss or pad 72 formed on the divider wall 50 by any suitable means, such as stamping, or it may be a rectangular-shaped or other-shaped member (not shown) secured to the divider wall 50 in any suitable manner, such as by welding.

A secondary pump outlet opening or discharge port 74 is formed in the divider wall 50 approximately 180° away from the primary discharge port 70. A pump or dam element 75 is associated with the port 74 similar to the pump 72 and port 70 arrangement. Flow of fluid through the port 74 is controlled by a valve-end 76 of a temperature-responsive bimetallic strip 78 whose other end 80 is secured in any suitable manner, such as by spotwelding, to a boss or pad 82 formed radially inwardly of the discharge port 74 and spaced apart from the radius line of the latter.

A pair of oppositely disposed inlet ports 84 and 86 are also formed in the divider wall 50, communicating between the annular reservoir 68 and the working chamber 60 radially inward of the pump element 72 and the pump outlet opening 70. The oppositely disposed inlet ports 84 and 86 are located in the direction of fluid flow at the farthest possible circumferential distance from the pump discharge ports 70 and 74, the port 86 being formed as close to the boss 82 as possible, in order that fluid entering the reservoir 68 via the ports 70 and 74 will be caused to flow in a clockwise direction (FIG. 3) through a substantial portion of the reservoir area before reaching the respective inlet ports 84 and 86, thereby serving to stabilize the fluid temperature.

The inlet ports 84 and 86 remain open continuously and are of a predetermined size such that the fluid is not spilled therethrough from the reservoir 68 to the working chamber 60 too rapidly, causing premature shear drive-type engagement and a sudden change or upsurge in fan noise, or too slowly, causing late or delayed shear drive-type engagement. The sizes of the discharge ports 70 and 74 are also predetermined such that the fluid is continuously pumped out of the working chamber 60 so long as the port 74 remains open, but the primary discharge port 70 must not be so large that the engagement process is prolonged once the secondary port 74 is closed.

Operation

So long as the vehicle engine 10 (FIG. 1) is in operation, the drive shaft 16 and the associated clutch plate 58 (FIG. 2) will be driven by the pulley 14 operatively connected via the belt 18 to the crankshaft (not shown) at an appropriate speed ratio with respect to engine speed.

It is apparent that, so long as viscous fluid remains in the working chamber 60, providing fluid in the fluid shear space 66 between the oppositely disposed spaced ridge and groove elements 62 and 64, there will result a shear-type fluid drive therebetween, and "slip speed," or the difference between the speed of the rotating clutch plate 50 and that of the housing 30 will depend upon the volume of the fluid contained therein. Inasmuch as the discharge port 70 and the inlet ports 84 and 86 are always open, a fluid circulation process will prevail, i.e., the rotating pump or dam element 72 will continuously promote the flow of fluid from the working chamber 60 through the primary pump outlet opening 70 to the annular reservoir from whence it will continuously return to the working chamber 60 via the continuously open inlet ports 84 and 86.

When ambient temperature rises above a predetermined temperature, the valve-end portion 76 of the internal bimetallic strip 78 closes off the secondary discharge port 74. Under this condition, the fluid enters the working chamber 60 via the inlet ports 84 and 86 more rapidly than it can be pumped out of the primary pump discharge port 70, causing the relatively rotatable drive members 58 and 32 to operate at minimum slip speed and thereby effecting a maximum cooling function, inasmuch as the fan 20 is secured to the outer portion of the rear wall member 32 of the housing 30 (FIG. 1).

When ambient temperature drops below the predetermined temperature, the recirculating fluid, being in contact with a maximum area of the cover member 38, also cools, thereby directly affecting the temperature of the internal bimetallic strip 78, causing the valve-end 76 of the latter to lift away from the secondary discharge port 74, permitting the rotating pump or dam element 75 to promote the flow of fluid through the port 74. The fluid thereupon flows out from the working chamber 60 through both discharge ports 70 and 74 to the reservoir 68 faster than it can return from the reservoir 68 via the inlet ports 84 and 86 to the working chamber 60. Under this condition, commonly known as the "disengaged mode," the slip between the clutch plate 50 and the housing 30 is greatest and fan speed is at a minimum.

It should be apparent that the invention provides simplified, economical and efficient means for controlling the fluid flow back and forth between the working and reservoir chambers to thereby control fan speed in response to ambient temperature.

While but one embodiment of the invention has been shown and described, other modifications thereof are possible.

We claim:

1. A viscous fluid clutch comprising first and second relatively rotatable drive means, said first drive means having an annular working chamber and an annular reservoir chamber, fluid shear drive means formed on said first and second drive means located in said working chamber and operable with a fluid medium to provide a shear-type fluid drive between said first and second drive means, said working chamber having first and second outlet opening means at an outer portion thereof and first and second continuously open inlet opening means at an inner portion thereof, pump means formed on one of said first and second drive means to pump said fluid medium from said working chamber through said first outlet opening means into said reservoir chamber, and an internally mounted bimetallic valve for controlling the flow of said fluid medium from said working chamber through said second outlet opening means into said reservoir chamber in response to changes in ambient temperature.

2. A viscous fluid clutch comprising a first member, a second member encompassing said first member and being rotatably supported thereon, a working chamber forming a viscous shear drive relationship between said first and second members, interior wall means cooperating with one of said first and second members to form an annular reservoir therebetween, a viscous fluid medium disposed in said working chamber and adapted to be transferred to said annular reservoir, first and second outlet ports operatively connected between said working chamber and said annular reservoir, pump means operatively connected to said first member for pumping a portion of said viscous fluid medium from said working chamber through said first outlet port into said annular reservoir, internal temperature-responsive valve means for controlling the flow of another portion of said viscous fluid medium from said working chamber through said second outlet port into said annular reservoir, and first and second inlet ports operatively connected between said annular reservoir and said working chamber for continuously communicating said viscous fluid medium from said annular reservoir to said working chamber.

3. A viscous fluid clutch comprising first and second relatively rotatable drive members, said first drive member including a first wall, a second wall and a divider wall sealed between said first and second walls providing a working chamber between said divider and second walls and a reservoir chamber between said first and divider walls, fluid shear drive means formed on said first and second drive members in said working chamber and operable with a fluid medium to provide a shear-type fluid drive therebetween, first and second oppositely disposed outlet ports formed in said divider wall for providing fluid communication from said working chamber to said reservoir chamber, first and second pump means formed on said divider wall for causing said fluid medium to flow from said working chamber through said respective first and second outlet ports to said reservoir chamber, temperature-responsive bimetallic valve means mounted on said divider wall in said reservoir chamber for controlling the flow of said fluid medium from said working chamber through said second outlet port to said reservoir chamber, and first and second oppositely disposed continuously open ports formed in said divider wall in a predetermined circumferentially located relationship with said first and second outlet ports for communicating said fluid medium from said reservoir chamber to said working chamber.

4. A viscous fluid clutch comprising an input shaft, a clutch plate secured to said input shaft, a fluid clutch housing rotatably mounted on said input shaft, a cover member sealed to said housing, a divider wall secured for rotation with said cover member and said housing and mounted between said cover member and said clutch plate so as to form an annular reservoir with said cover member and an annular working chamber with said housing, first and second oppositely disposed discharge openings formed in said divider wall at a radial outer portion thereof between said annular working chamber and said annular reservoir, first and second dam elements formed on said divider wall in said annular working chamber for pumping a fluid medium from said annular working chamber through said respective first and second discharge openings to said annular reservoir, a temperature-responsive bimetallic strip mounted on said divider wall for moving into and out of contact with said second discharge opening and thereby controlling the flow of said fluid medium through said second discharge opening in response to ambient temperature changes, and first and second oppositely disposed intake openings formed in said divider wall at a radial inner portion thereof for continuously communicating said fluid medium from said annular reservoir to said annular working chamber, said first and second intake openings being circumferentially located in the direction of fluid flow as far as possible from said respective first and second discharge openings without interfering with the action of said temperature-responsive bimetallic strip.

* * * * *